United States Patent
Conover

(10) Patent No.: US 7,328,323 B1
(45) Date of Patent: Feb. 5, 2008

(54) HEAP BUFFER OVERFLOW EXPLOITATION PREVENTION SYSTEM AND METHOD

(75) Inventor: Matthew Conover, Mountain View, CA (US)

(73) Assignee: Symantec Corporation, Cupertino, CA (US)

( * ) Notice: Subject to any disclaimer, the term of this patent is extended or adjusted under 35 U.S.C. 154(b) by 753 days.

(21) Appl. No.: 10/796,358

(22) Filed: Mar. 8, 2004

(51) Int. Cl.
- G06F 12/00 (2006.01)
- G06F 13/00 (2006.01)
- G06F 13/28 (2006.01)
- G06F 11/00 (2006.01)

(52) U.S. Cl. .................. 711/170; 711/154; 714/2
(58) Field of Classification Search .................. None
See application file for complete search history.

(56) References Cited

U.S. PATENT DOCUMENTS

| | | | |
|---|---|---|---|
| 6,832,302 B1 * | 12/2004 | Fetzer et al. ............ | 711/170 |
| 2003/0014667 A1 * | 1/2003 | Kolichtchak ............ | 713/201 |
| 2003/0172293 A1 * | 9/2003 | Johnson et al. ........ | 713/200 |
| 2004/0221120 A1 * | 11/2004 | Abrashkevich et al. ... | 711/170 |

OTHER PUBLICATIONS

"Advanced Doug Lea's Malloc Exploits", pp. 1-42 [online]. Retrieved Feb. 12, 2004. Retrieved from the internet: URL:http://www.phrack.org/phrack/61/p61-0x06_Advanced_malloc_exploits.txt. Anonymous author.

Kaempf, Michel, "Vudo—An Object Superstitiously Believed To Embody Magical Powers", pp. 1-49 [online]. Retrieved Feb. 12, 2004. Retrieved from the internet: URL:http://www.phrack.org/phrack/57/p57-0x08.

"Once Upon A Free () . . . ", pp. 1-15 [online]. Retrieved Feb. 12, 2004. Retrieved from the internet: URL:http://www.phrack.org/phrack/57/p57-0x09. Anonymous author.

Conover, Matt, "W00W00 On Heap Overflows", pp. 1-18 [online]. Retrieved Feb. 9, 2004. Retrieved from the internet: URL:http://www.w00w00.org/files/heaptut/heaptut.txt.

* cited by examiner

*Primary Examiner*—Sanjiv Shah
*Assistant Examiner*—Marwan Ayash
(74) *Attorney, Agent, or Firm*—Gunnison, McKay & Hodgson, L.L.P.; Serge J. Hodgson

(57) ABSTRACT

A method includes stalling a call to a heap allocation function originating from a request by an application for a block of heap buffer, predicting a block of the heap buffer to fulfill the request, and determining if a forward link (F-link) and a backward link (B-link) of the predicted block are addresses within a heap segment associated with the predicted block. If a determination is made that the F-link or the B-link point outside the associated heap segment, e.g., have been overwritten by a heap buffer overflow attack, corrective action is taken to correct the stray F-link or B-link. After the corrective action is taken, the heap allocation function call is released and the block of heap buffer is allocated. In this manner, a heap buffer overflow attack is defeated.

17 Claims, 7 Drawing Sheets

HEAP BUFFER OVERFLOW EXPLOITATION PREVENTION SYSTEM AND METHOD

BACKGROUND OF THE INVENTION

1. Field of the Invention

The present invention relates to the protection of computer systems. More particularly, the present invention relates to a system and method of preventing heap buffer overflow exploitation.

2. Description of the Related Art

Buffer overflow techniques have been used by malicious hackers and virus writers to attack computer systems.

Buffers are data storage areas, which generally hold a predefined amount of finite data. A buffer overflow occurs when a program attempts to store data into the buffer, where the data is larger than the size of the buffer.

One category of buffer overflow, sometimes called heap buffer overflow, involves overwriting heap memory. Heap buffer overflow is typically caused by programs that do not verify the length of the data being copied into a buffer.

When the data exceeds the size of the buffer, the extra data can overflow into the adjacent memory locations. In this manner, it is possible to corrupt valid data and possibly to change the execution flow and instructions. Thus, by exploiting a heap buffer overflow, it is possible to inject malicious code, sometimes called shell code, into the execution flow. This shell code allows remote system level access, giving unauthorized access to not only malicious hackers, but also to replicating malware, e.g., worms.

SUMMARY OF THE INVENTION

In accordance with one embodiment of the present invention, a method includes stalling a heap allocation function call to a heap allocation function originating from a request by an application for a block of heap buffer, predicting a predicted block of the heap buffer to fulfill the request, and determining if a forward link (F-link) and a backward link (B-link) of the predicted block are addresses within a heap segment associated with the predicted block. If a determination is made that the F-link or the B-link point outside the associated heap segment, e.g., have been overwritten by a heap buffer overflow attack, corrective action is taken to correct the stray F-link or B-link. After the corrective action is taken, the heap allocation function call is released and the block of heap buffer is allocated. In this manner, a heap buffer overflow attack is defeated.

In accordance with another embodiment of the present invention, a method includes stalling a heap deallocation function call to a heap deallocation function originating from a release by an application of a block of heap buffer, wherein the block is a deallocation block that is being deallocated to a deallocation freelist, and determining if a F-link of a list head of the deallocation freelist and a B-link of a first block of the deallocation freelist are addresses within a heap segment associated with the deallocation freelist. If a determination is made that the F-link or the B-link point outside the associated heap segment, e.g., have been overwritten by a heap buffer overflow attack, corrective action is taken to correct the stray F-link or B-link. After the corrective action is taken, the heap deallocation function call is released and the block of heap buffer is deallocated. In this manner, a heap buffer overflow attack is defeated.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

In accordance with one embodiment, a method includes stalling a heap allocation function call to a heap allocation function originating from a request by an application for a block of heap buffer in a STALL CALL OPERATION 208 (FIG. 2), predicting a predicted block of the heap buffer to fulfill the request in a PREDICT FREELIST AND BLOCK TO FULFILL REQUEST OPERATION 212, and determining if a forward link (F-link) and a backward link (B-link) of the predicted block are addresses within a heap segment associated with the predicted block in a F-LINKS AND B-LINKS IN ASSOCIATED HEAP SEGMENT CHECK OPERATION 216. If a determination is made that the F-link or the B-link point outside the associated heap segment, e.g., have been overwritten by a heap buffer overflow attack, corrective action is taken to correct the stray F-link or B-link in a TAKE CORRECTIVE ACTION OPERATION 224. After the corrective action is taken, the heap allocation function call is released in a RELEASE CALL OPERATION 218 and the block of heap buffer is allocated. In this manner, a heap buffer overflow attack is defeated.

In accordance with another embodiment of the present invention, a method includes stalling a heap deallocation function call to a heap deallocation function originating from a release by an application of a block of heap buffer in a STALL CALL OPERATION 608 (FIG. 6), wherein the block is a deallocation block that is being deallocated to a deallocation freelist, and determining if a F-link of a list head of the deallocation freelist and a B-link of a first block of the deallocation freelist are addresses within a heap segment associated with the deallocation freelist in a F-LINKS AND B-LINKS IN ASSOCIATED HEAP SEGMENT CHECK OPERATION 626. If a determination is made that the F-link or the B-link point outside the associated heap segment, e.g., have been overwritten by a heap buffer overflow attack, corrective action is taken to correct the stray F-link or B-link in a TAKE CORRECTIVE ACTION OPERATION 224. After the corrective action is taken, the heap deallocation function call is released in a RELEASE CALL OPERATION 628 and the block of heap buffer is deallocated. In this manner, a heap buffer overflow attack is defeated.

Figure 1:
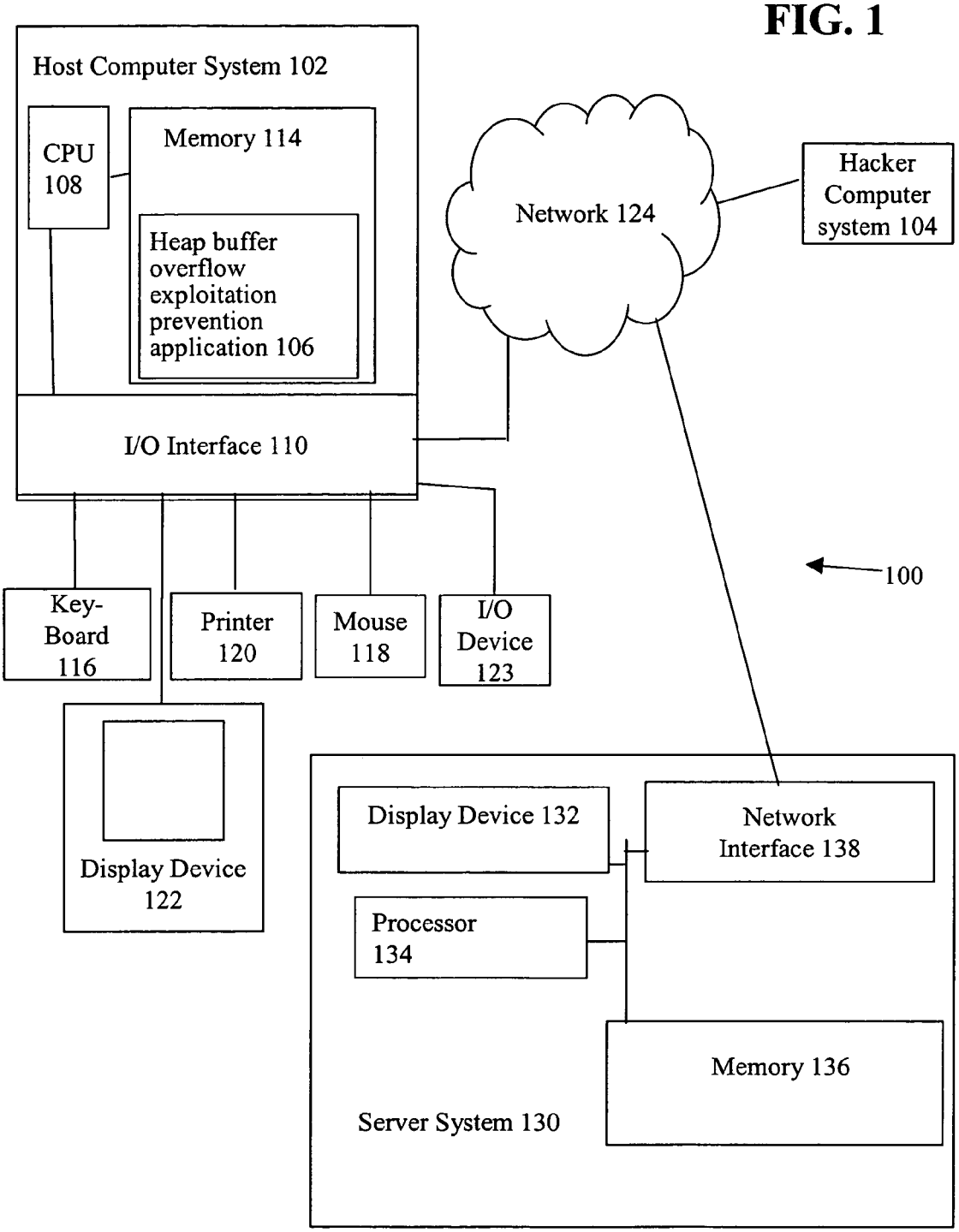
FIG. 1 is a diagram of a client-server system that includes a heap buffer overflow exploitation prevention application executing on a host computer system in accordance with one embodiment of the present invention.

More particularly, FIG. 1 is a diagram of a client-server system 100 that includes a heap buffer overflow exploitation prevention application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, heap buffer overflow exploitation prevention application 106 is loaded into host computer system 102 via I/O device 123, such as from a CD, DVD or floppy disk containing heap buffer overflow exploitation prevention application 106.

In one embodiment, memory 114 includes a virtual memory system. For example, the virtual memory system is a page based virtual memory system that uses pages, e.g., 4096 byte memory areas. Virtual memory systems are well known to those of skill in the art and so are only discussed briefly to avoid detracting from the principles of the invention. Memory 114 includes a heap buffer, sometimes called the heap or heap buffer memory, in one example.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principles of the invention.

Network 124 can be any network or network system that is of interest to a user. In various embodiments, network interface 138 and I/O interface 110 include analog modems, digital modems, or a network interface card.

Heap buffer overflow exploitation prevention application 106 is stored in memory 114 of host computer system 102 and executed on host computer system 102. The particular type of and configuration of host computer system 102, hacker computer system 104, and server system 130 are not essential to this embodiment of the present invention.

Figure 2:
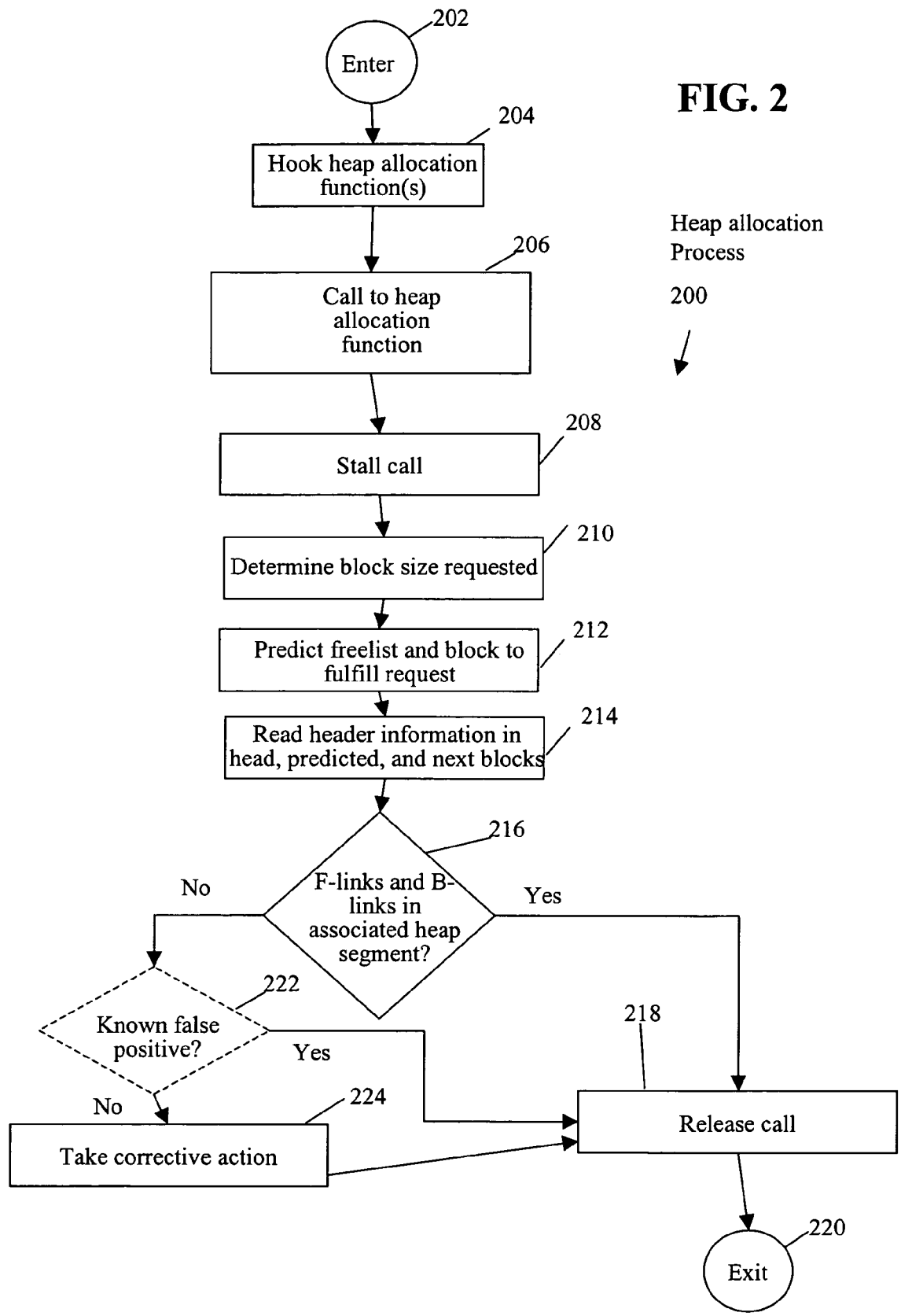
FIG. 2 is a flow diagram of a heap allocation process in accordance with one embodiment of the present invention.

FIG. 2 is a flow diagram of a heap allocation process 200 in accordance with one embodiment of the present invention. Referring now to FIGS. 1 and 2 together, execution of heap buffer overflow exploitation prevention application 106 by processor 108 results in the operations of heap allocation process 200 as described below in one embodiment.

From an ENTER OPERATION 202, flow moves to a HOOK HEAP ALLOCATION FUNCTION(S) OPERATION 204. In HOOK HEAP ALLOCATION FUNCTION(S) OPERATION 204, heap allocation function(s) of host computer system 102 are hooked. In one embodiment, a heap allocation function is a function used to allocate heap buffer area.

Generally, at least one heap allocation function of host computer system 102 is hooked in HOOK HEAP ALLOCATION FUNCTION(S) OPERATION 204. In one particular embodiment, the RtlAllocateHeap function is hooked in HOOK HEAP ALLOCATION FUNCTION(S) OPERATION 204. In another embodiment, heap allocation functions are hooked by hooking NTDLL.DLL. Further, a heap allocation function is hooked by routing the heap allocation function call to a hook module, e.g., which is part of heap buffer overflow exploitation prevention application 106, in accordance with one embodiment.

In another embodiment, an instruction, e.g., a jump instruction, is inserted directly into the heap allocation function to hook the heap allocation function in HOOK HEAP ALLOCATION FUNCTION(S) OPERATION 204.

Although various examples of hooking a heap allocation function are described above, in light of this disclosure, those of skill in the art will understand that other techniques can be used to hook heap allocation functions. The particular technique used depends, for example, on the particular operating system.

From HOOK HEAP ALLOCATION FUNCTION(S) OPERATION 204, flow moves to a CALL TO HEAP ALLOCATION FUNCTION OPERATION 206. In CALL TO HEAP ALLOCATION FUNCTION OPERATION 206, a call, sometimes called a heap allocation function call, to a heap allocation function is made, for example, by a user mode application requesting a block of heap buffer. More particularly, a heap allocation function call is made to a heap allocation function that was hooked in HOOK HEAP ALLOCATION FUNCTION(S) OPERATION 204.

In one embodiment, the application that requests the block of heap buffer and originates the heap allocation function call is referred to as the heap block requesting application.

From CALL TO HEAP ALLOCATION FUNCTION OPERATION 206, flow moves to a STALL CALL OPERATION 208. In STALL CALL OPERATION 208, the heap allocation function call of operation 206 to the heap allocation function is stalled. By stalling the heap allocation function call, allocation of the requested block of heap buffer is stalled.

As is well known to those of skill in art, the heap, sometimes called the heap buffer, is broken into a set of variable sized blocks. A program, herein referred to as the heap block requesting application, requests a certain block size and the heap manager, e.g., on a Windows operating system, finds the smallest block to fulfill the request.

For performance reasons, the heap manager maintains doubly linked lists of free blocks. These doubly linked lists of free blocks are referred to as freelists.

In one example, a freelist contains a doubly linked list of free blocks, where each of the free blocks is a particular size, i.e., all of the free blocks on the freelist have the same size. Illustratively, free blocks having a commonly requested size are typically lumped together in a single freelist. As an example, an n byte freelist contains only n byte size free blocks arranged as a doubly linked list, wherein n is selected from the group consisting of 8, 16, 24, . . . , 1024.

In another example, a freelist contains a doubly linked list of free blocks, where at least one of the free blocks has a different size than at least one other free block on the doubly linked list. Illustratively, a greater than 1024 byte freelist contains free blocks arranged as a doubly linked list, where each free block has a minimum size of greater than 1024 bytes and is arranged in ascending order. In accordance with this example, a first free block has a size less than a second free block on the freelist, although both the first free block and a second free block each have a minimum size of greater than 1024 bytes.

A freelist begins with a list head, sometimes called the head of the freelist. A list head is not a true block in that it contains no data and is not allocated or deallocated. More particularly, a list head is used simply as an entry into the freelist and includes pointers to the first free block of the freelist and to the last free block of the freelist absent corruption of the list head. In one example, a freelist is a circular doubly linked list such that movement from free block to free block of the freelist will eventually return to the list head.

From STALL CALL OPERATION 208, flow moves to a DETERMINE BLOCK SIZE REQUESTED OPERATION 210. In DETERMINE BLOCK SIZE REQUESTED OPERATION 210, the size of the block of heap buffer requested by the program is determined. In one embodiment, parameters associated with the heap allocation function call are analyzed to determine the size of the requested block.

From DETERMINE BLOCK SIZE REQUESTED OPERATION 210, flow moves to a PREDICT FREELIST AND BLOCK TO FULFILL REQUEST OPERATION 212. In PREDICT FREELIST AND BLOCK TO FULFILL REQUEST OPERATION 212, the block requested by the heap block requesting application is predicted. The block predicted to be the block requested by the heap block requesting application is sometimes called the predicted block. Further, the freelist containing the requested block is also predicted. The freelist predicted to contain the requested block is sometimes called the predicted freelist. The predicted freelist includes the predicted block.

As set forth above, the size of the block requested is determined in DETERMINE BLOCK SIZE REQUESTED OPERATION 210. Using the size of the block, a prediction is made as to which freelist contains the block. More particularly, the freelist formed of free blocks having or including the size matching or greater than the size to the block requested is selected as the predicted freelist. Further, the first block on the predicted freelist matching or greater than the size of the block requested is selected as the predicted block. In one embodiment, the predicted freelist and predicted block are identified by performing operations similar or identical to the operations performed by the RtlAllocateHeap function.

From PREDICT FREELIST AND BLOCK TO FULFILL REQUEST OPERATION 212, flow moves to a READ HEADER INFORMATION IN HEAD, PREDICTED, AND NEXT BLOCKS OPERATION 214. As is well known to those of skill in art, a free block includes a header portion, sometimes called header, e.g., the first 16 bytes, and a data portion. The header portion includes information associated with the free block and the data portion is a blank area reserved for data.

For example, the header portion includes a backward link (B-link) field, a forward link (F-link) field, and a heap segment index field. The B-link field, the F-Link and the heap segment index field contain a B-link, a F-link, and a heap segment index, i.e., values, respectively. The B-link and F-link are addresses that point to the backward free block and the forward free block, respectively, in the freelist to which the free block belongs absent corruption. The heap segment index includes information about the heap segment to which the free block belongs.

Further, in one embodiment, the header portion includes information on the contiguous blocks.

Returning again to READ HEADER INFORMATION IN HEAD, PREDICTED, AND NEXT BLOCKS OPERATION 214, the header information in the predicted list head, the predicted block, and the predicted next block is read. In accordance with this embodiment, the predicted list head is the list head of the predicted freelist. The predicted next block is the next free block forward of the predicted block on the predicted freelist.

In one embodiment, the F-link and the heap segment index of the predicted list head are read. Further, the F-link, the B-link, and the heap segment index of the predicted block are read. Finally, the B-link and the heap segment index of the predicted next block are read.

From READ HEADER INFORMATION IN HEAD, PREDICTED, AND NEXT BLOCKS OPERATION 214, flow moves to a F-LINKS AND B-LINKS IN ASSOCIATED HEAP SEGMENT CHECK OPERATION 216. In F-LINKS AND B-LINKS IN ASSOCIATED HEAP SEGMENT CHECK OPERATION 216, a determination is made as to whether the F-link of the predicted list head, the F-link and B-link of the predicted block, and the B-link of the predicted next block point into the associated heap segment.

As is well known to those of skill in the art, the heap is broken into heap segments. Each free block is associated with a heap segment, i.e., is within the address space of a heap segment. The heap segment index in the header portion of the free block indicates the associated heap segment. Further, in the process environment block (PEB), there is a pointer to the base of the heap. At the base of the heap, there is information that sets forth the range (address space) of each heap segment. Thus, using the PEB, the start and end addresses of each heap segment are determined.

Thus, in accordance with one embodiment of the present invention, a determination is made as to whether the F-link of the predicted list head, the F-link and B-link of the predicted block, and the B-link of the predicted next block are addresses within the associated heap segment in F-LINKS AND B-LINKS IN ASSOCIATED HEAP SEGMENT CHECK OPERATION 216.

If a determination is made that the F-link of the predicted list head, the F-link and B-link of the predicted block, and the B-link of the predicted next block point into the associated heap segment, flow moves from F-LINKS AND B-LINKS IN ASSOCIATED HEAP SEGMENT CHECK OPERATION 216 to a RELEASE CALL OPERATION 218. Conversely, if a determination is made that at least one of the F-link of the predicted list head, the F-link and B-link of the predicted block, and the B-link of the predicted next block does not point into the associated heap segment, flow moves from F-LINKS AND B-LINKS IN ASSOCIATED HEAP SEGMENT CHECK OPERATION 216 to a KNOWN FALSE POSITIVE CHECK OPERATION 222.

More particularly, absent corruption, the F-link of the predicted list head, the F-link and B-link of the predicted block, and the B-link of the predicted next block point into, i.e., are addresses within, the associated heap segment. Accordingly, if the F-link of the predicted list head, the F-link and B-link of the predicted block, and the B-link of the predicted next block point into the associated heap segment, the likelihood that malicious code, e.g., shell code, has been introduced into the predicted list head, predicted block or the predicted next block is minimal. In one embodiment, malicious code is defined as any computer program, module, set of modules, or code that enters a computer system without an authorized user's knowledge and/or without an authorized user's consent. If there is no corruption, flow moves to RELEASE CALL OPERATION 218.

In RELEASE CALL OPERATION 218, the heap allocation function call is allowed to proceed. As discussed above, the heap allocation function call was stalled in STALL CALL OPERATION 208. From RELEASE CALL OPERATION 218, flow moves to and exits at an EXIT OPERATION 220 or waits for the next heap allocation function call and returns to operation 206.

However, if a determination is made in CHECK OPERATION 216 that at least one of the F-link of the predicted list head, the F-link and the B-link of the predicted block, and the B-link of the predicted next block does not point into the associated heap segment, flow moves, optionally, to KNOWN FALSE POSITIVE CHECK OPERATION 222 (or directly to a TAKE CORRECTIVE ACTION OPERATION 224 if KNOWN FALSE POSITIVE CHECK OPERATION 222 is not performed). A F-link or B-link that points outside, i.e., is an address outside, of its associated heap segment is sometimes called a stray F-link or stray B-link, respectively.

In KNOWN FALSE POSITIVE CHECK OPERATION 222, a determination is made as to whether the stray F-link(s) and/or stray B-link(s) are a known false positive. A known false positive stray F-link(s) and/or stray B-link(s) is a stray F-link(s) and/or stray B-link(s) that is, in fact, safe, i.e., is not associated with malicious code. Illustratively, a user-defined or downloadable exclusion and/or inclusion list is used to determine whether the stray F-link(s) and/or stray B-link(s) is a known false positive.

If a determination is made in KNOWN FALSE POSITIVE CHECK OPERATION 222 that the stray F-link(s) and/or stray B-link(s) are a known false positive stray F-link(s) and/or stray B-link(s), flow moves to RELEASE CALL OPERATION 218, which is performed as discussed above. Conversely, if a determination is made in KNOWN FALSE POSITIVE CHECK OPERATION 222 that the stray F-link(s) and/or stray B-link(s) is not a known false positive stray F-link(s) and/or stray B-link(s), flow moves to TAKE CORRECTIVE ACTION OPERATION 224.

In TAKE CORRECTIVE ACTION OPERATION 224, corrective action is taken to prevent the malicious code of the predicted freelist from causing damage to or exploiting host computer system 102. TAKE CORRECTIVE ACTION OPERATION 224 is discussed further below with reference to the FIGS. 7-13. In one embodiment, the freelist is cut off at the corrupted block by overwriting the F-link and the B-link of the corrupted block in TAKE CORRECTIVE ACTION OPERATION 224. From TAKE CORRECTIVE ACTION OPERATION 224, flow moves to RELEASE CALL OPERATION 218, which is performed as discussed above.

In one embodiment, several free blocks are coalesced to satisfy the heap allocation request. In accordance with this embodiment, OPERATIONS 210, 212, 214, 216 and possibly OPERATIONS 222, 224 are performed as each free block is allocated and coalesced.

In another embodiment, only the B-link, the F-link and the associated heap segment index of the predicted block are read in operation 214 and a determination is made as to whether the F-link and B-link of the predicted block are addresses within the associated heap segment in operation 216. In yet another embodiment, either the B-link of the predicted next block and the associated heap segment index or the F-link of the list head and the associated heap segment index, but not both, are read in addition to the F-link and B-link of the predicted block in operation 214 and a determination is made as to whether the F-link and B-link of the predicted block, and either the B-link of the predicted next block or the F-link of the list head are addresses within the associated heap segment in operation 216.

Figure 3:
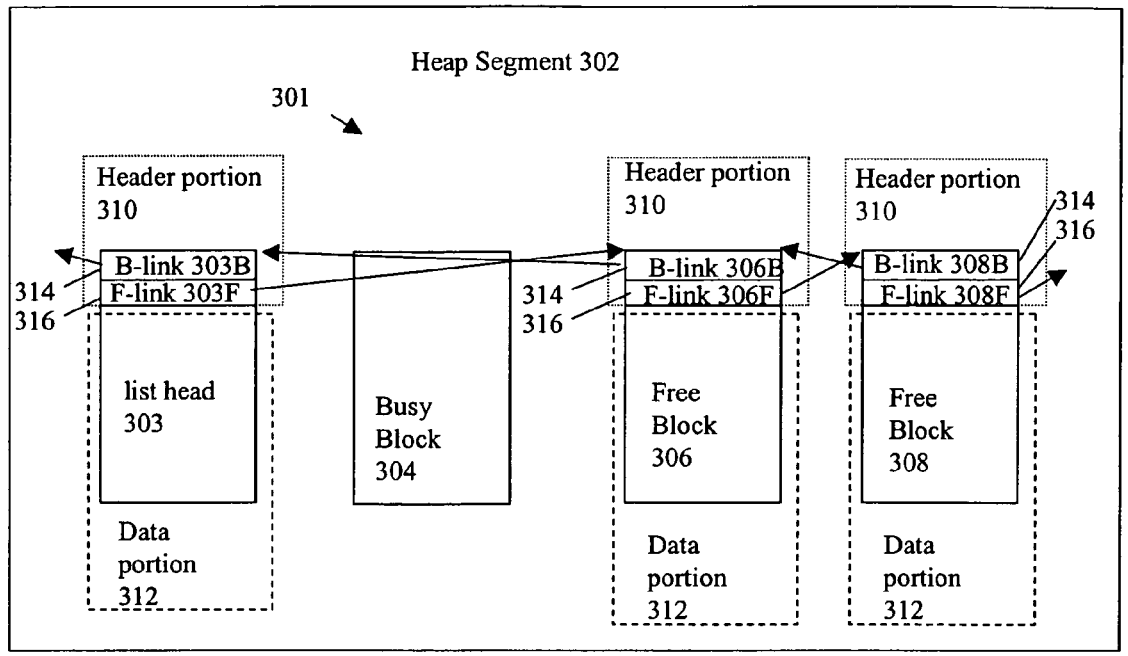
FIG. 3 is a block diagram of a heap segment including a nonmalicious freelist in accordance with one embodiment of the present invention.

FIG. 3 is a block diagram of a heap segment 302 including a nonmalicious freelist 301 in accordance with one embodiment of the present invention. Referring now to FIG. 3, freelist 301, which is nonmalicious, i.e., is not corrupt, includes a list head 303, a free block 306, and a free block 308. Freelist 301 is a circular double linked list and may include additional free blocks that are not illustrated for clarity of presentation.

As shown, busy blocks may be interposed between list head 303, free block 306, and free block 308. For example, a busy block 304 is between list head 303 and free block 306. As discussed in greater detail below with reference to FIG. 5, by overflowing busy block 304, it is possible to corrupt free block 306.

List head 303, free block 306, and free block 308 each include a header portion 310, sometimes called header, and a data portion 312. Each header portion 310 includes a B-link field 314 and a F-link field 316. B-link fields 314 and F-link fields 316 include B-links and F-links.

More particularly, B-link field 314 and F-link field 316 of list head 303 include B-link 303B and F-link 303F, respectively. B-link 303B is the base address, sometimes called starting address, of last free block of freelist 301 in accordance with this embodiment, and an address within heap segment 302. F-link 303F is the base address of free block 306.

Similarly, B-link field 314 and F-link field 316 of free block 306 include B-link 306B and F-link 306F, respectively. B-link 306B is the base address of list head 303 of freelist 301. F-link 306F is the base address of free block 308.

Similarly, B-link field 314 and F-link field 316 of free block 308 include B-link 308B and F-link 308F, respectively. B-link 308B is the base address of free block 306 of freelist 301. F-link 308F is the base address of the next free block of freelist 301 (or of list head 303 in the case where free block 308 is at the end of freelist 301, i.e., is the last block of freelist 301).

Referring now to FIGS. 2 and 3 together, in CALL TO HEAP ALLOCATION FUNCTION OPERATION 206, a heap allocation function call to allocate free block 306 is made. The heap allocation function call is stalled in STALL CALL OPERATION 208. The size of the requested block is determined in DETERMINE BLOCK SIZE REQUESTED OPERATION 210.

In PREDICT FREELIST AND BLOCK TO FULFILL REQUEST OPERATION 212, a prediction is made that freelist 301 is the predicted freelist and that free block 306 is the predicted block. Accordingly, list head 303 is the predicted list head, and free block 308 is the predicted next block.

In READ HEADER INFORMATION IN HEAD, PREDICTED, AND NEXT BLOCKS OPERATION 214, B-links 306B, 308B, F-links 303F, 306F and the heap segment indexes (not shown in FIG. 3) in header portions 310 are read from list head 303, free block 306, and free block 308, respectively.

In F-LINKS AND B-LINKS IN ASSOCIATED HEAP SEGMENT CHECK OPERATION 216, a determination is made that B-links 306B, 308B and F-links 303F, 306F are all addresses within heap segment 302, i.e., point into heap segment 302. Accordingly, freelist 301 is not corrupt and flow moves to RELEASE CALL OPERATION 218. In RELEASE CALL OPERATION 218, the heap allocation function call is released and free block 306 is allocated, i.e., removed from freelist 301.

Figure 4:
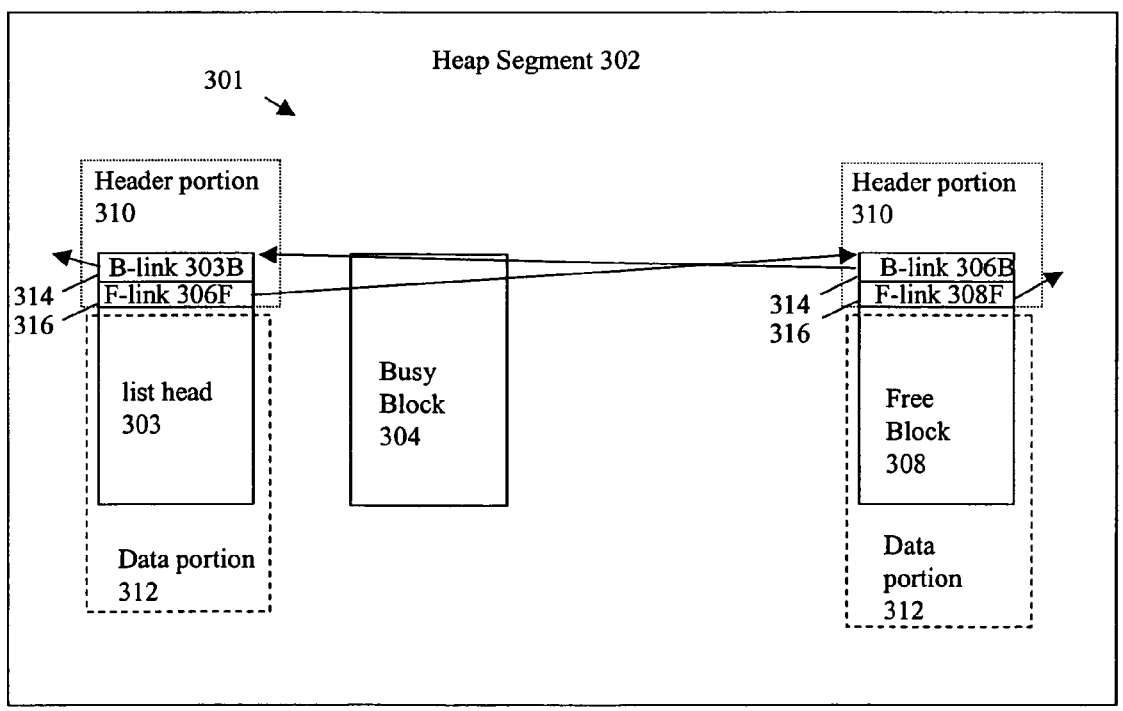
FIG. 4 is a block diagram of the heap segment of FIG. 3 including the freelist after allocation of a free block in accordance with one embodiment of the present invention.

FIG. 4 is a block diagram of heap segment 302 of FIG. 3 including freelist 301 after allocation of free block 306 in accordance with one embodiment of the present invention. Referring now to FIGS. 3 and 4 together, during allocation of free block 306, B-link 306B of free block 306 is moved into B-link field 314 of free block 308 and overwrites B-link 308B. Accordingly, free block 308 has a backwards pointer, i.e., B-link 306B, which now points to list head 303 as illustrated in FIG. 4.

Further, during allocation of free block 306, F-link 306F of free block 306 is moved into F-link field 316 of list head 303 and overwrites F-link 303F. Accordingly, list head 303 has a forward pointer, i.e., F-link 306F, which now points to free block 308 as illustrated in FIG. 4.

As described above, during allocation of free block 306, freelist 301 is updated by moving information, i.e., F-link 306F and B-link 306B, from free block 306 into list head 303 and free block 308, respectively. In accordance with one embodiment, because a malicious hacker may be able to overflow busy block 304 and corrupt B-link 306B and F-link 306F, B-link 306B and F-link 306F are verified to point into heap segment 302, i.e., are verified to be uncorrupt, prior to allocation of free block 306, as described above. In this manner, propagation of corrupt data in F-link field 316 and/or B-link field 314 of free block 306 into list head 303 and/or free block 308 is prevented.

Figure 5:
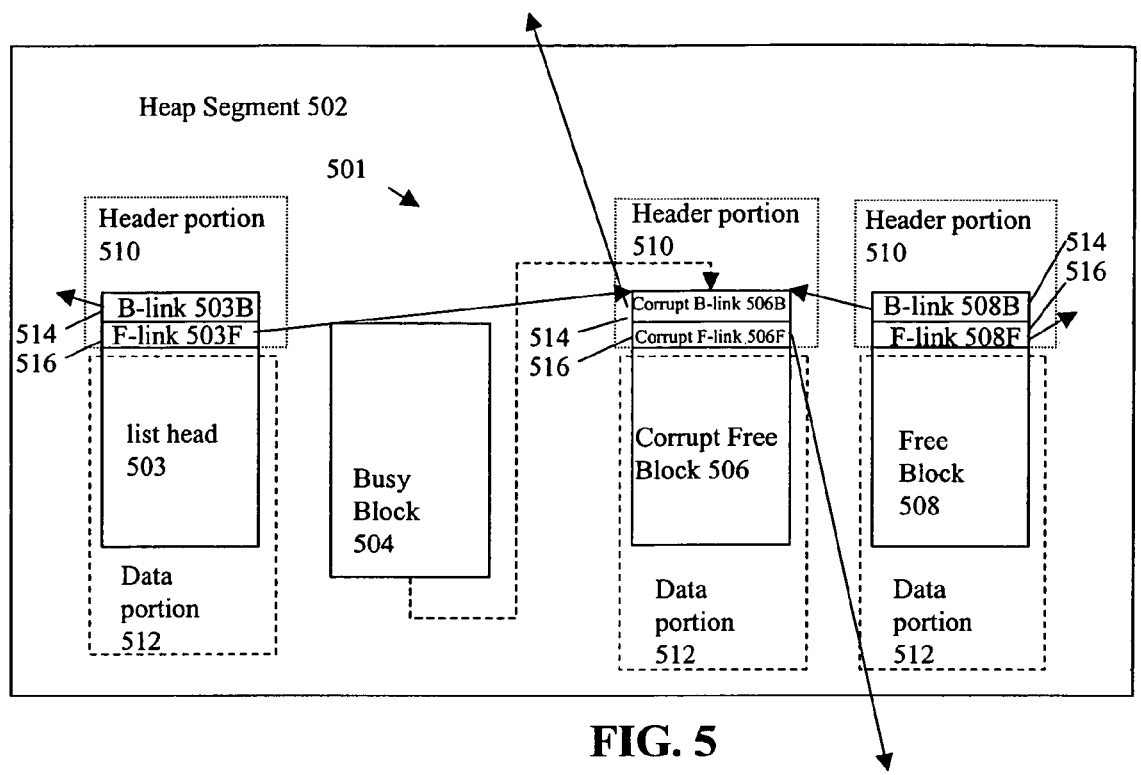
FIG. 5 is a block diagram of a heap segment including a malicious freelist in accordance with another embodiment of the present invention.

FIG. 5 is a block diagram of a heap segment 502 including a malicious freelist 501 in accordance with one embodiment of the present invention. Referring now to FIG. 5, freelist 501, which is malicious, i.e., contains malicious code, includes a list head 503, a corrupt free block 506, and a free block 508. Freelist 501 is a circular double linked list and may include additional free blocks that are not illustrated for clarity of presentation.

As shown, busy blocks may be interposed between list head 503, corrupt free block 506, and free block 508. For example, a busy block 504 is between list head 503 and corrupt free block 506. In accordance with this embodiment, by overflowing busy block 504, free block 506 has been corrupted. More particularly, by overflowing busy block 504, B-link field 514 and F-link field 516 of corrupt free block 506 have been overwritten to include a corrupt B-link 506B and a corrupt F-link 506F.

List head 503, corrupt free block 506, and free block 508 each include a header portion 510 and a data portion 512. Each header portion 510 includes a B-link field 514 and a F-link field 516. B-link fields 514 and F-link fields 516 include B-links and F-links.

More particularly, B-link field 514 and F-link field 516 of list head 503 include B-link 503B and F-link 503F, respectively. B-link 503B is the base address of the last free block of freelist 501 and is an address within heap segment 502. F-link 503F is the base address of corrupt free block 506.

As discussed above, B-link field 514 and F-link field 516 of corrupt free block 506 include corrupt B-link 506B and corrupt F-link 506F, respectively. Corrupt B-link 506B and corrupt F-link 506F are addresses outside of heap segment 502, i.e., point outside of heap segment 502. Illustratively, corrupt B-link 506B and/or corrupt F-link 506F point to a location containing malicious code, e.g., shell code. As another example, corrupt B-link 506B and/or corrupt F-link 506F point to a certain function pointer at a fixed address such as the structure exception handler or the PEBLockRoutine in the Process Environment block.

Similarly, B-link field 514 and F-link field 516 of free block 508 include B-link 508B and F-link 508F, respectively. B-link 508B is the base address of corrupt free block 506 of freelist 501. F-link 508F is the base address of the next free block of freelist 501 (or of list head 503 in the case where free block 508 is at the end of freelist 501, i.e., is the last block of freelist 501).

Referring now to FIGS. 2 and 5 together, in CALL TO HEAP ALLOCATION FUNCTION OPERATION 206, a heap allocation call to allocate free block 506 is made. The heap allocation call is stalled in STALL CALL OPERATION 208. The size of the requested block is determined in DETERMINE BLOCK SIZE REQUESTED OPERATION 210.

In PREDICT FREELIST AND BLOCK TO FULFILL REQUEST OPERATION 212, a prediction is made that freelist 501 is the predicted freelist and that free block 506 is the predicted block. Accordingly, list head 503 is the predicted list head, and free block 508 is the predicted next block.

In READ HEADER INFORMATION IN HEAD, PREDICTED, AND NEXT BLOCKS OPERATION 214, B-links 506B, 508B, F-links 503F, 506F and the heap segment indexes (not shown in FIG. 5) are read from list head 503, free block 506, and free block 508, respectively.

In F-LINKS AND B-LINKS IN ASSOCIATED HEAP SEGMENT CHECK OPERATION 216, a determination is made that corrupt B-link 506B and corrupt F-link 506F are not addresses within heap segment 502. Accordingly, freelist 501 is corrupt and flow moves to TAKE CORRECTIVE ACTION OPERATION 224 (after a negative determination in KNOWN FALSE POSITIVE CHECK OPERATION 222, if performed). In TAKE CORRECTIVE ACTION OPERATION 224, corrective action is taken to correct freelist 501, for example, as described below in reference to FIGS. 7, 10 and 11. From TAKE CORRECTIVE ACTION OPERATION 224, the heap allocation function call is released in RELEASE CALL OPERATION 218, and free block 506, which is now not corrupt, is allocated in a manner similar to that described above.

In accordance with this embodiment, because a malicious hacker has overflowed busy block 504 and corrupted B-link 506B and F-link 506F, B-link 506B and F-link 506F are corrected prior to allocation of free block 506. In this manner, propagation of corrupt data in B-link field 514 and F-link field 516 of free block 506 into list head 503 and free block 508 is prevented.

Figure 6:
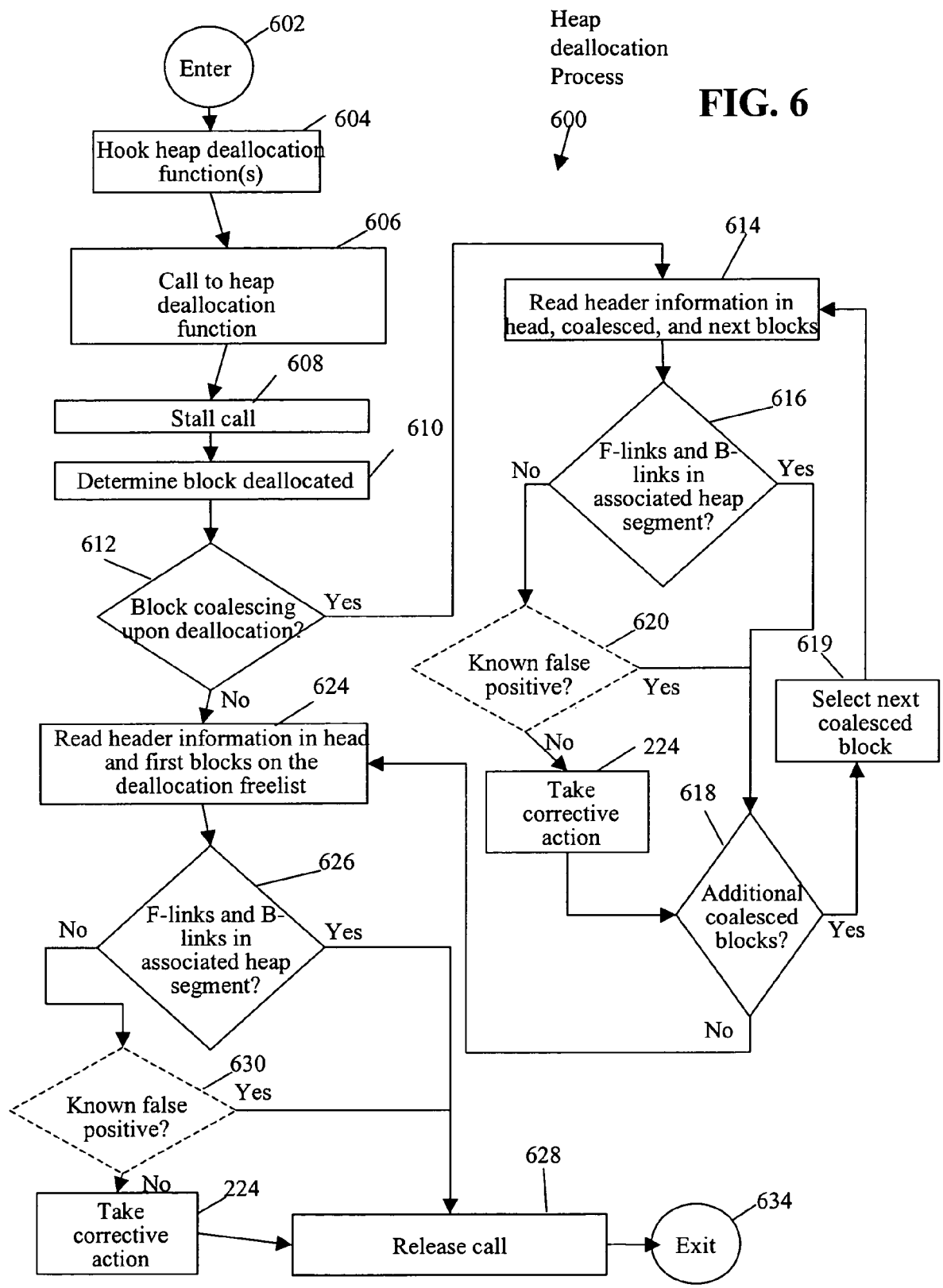
FIG. 6 is a flow diagram of a heap deallocation process in accordance with one embodiment of the present invention.

FIG. 6 is a flow diagram of a heap deallocation process 600 in accordance with one embodiment of the present invention. Referring now to FIGS. 1 and 6 together, execution of heap buffer overflow exploitation prevention application 106 by processor 108 results in the operations of heap deallocation process 600 as described below in one embodiment.

From an ENTER OPERATION 602, flow moves to a HOOK HEAP DEALLOCATION FUNCTION(S) OPERATION 604. In HOOK HEAP DEALLOCATION FUNCTION(S) OPERATION 604, heap deallocation function(s) of host computer system 102 are hooked. In one embodiment, a heap deallocation function is a function used to deallocate heap buffer area.

Generally, at least one heap deallocation function of host computer system 102 is hooked in HOOK HEAP DEALLOCATION FUNCTION(S) OPERATION 604. In one particular embodiment, the RtlFreeHeap function is hooked in HOOK HEAP DEALLOCATION FUNCTION(S) OPERATION 604. In another embodiment, heap deallocation functions are hooked by hooking NTDLL.DLL. Further, a heap deallocation function is hooked by routing the heap deallocation function call to a hook module, e.g., which is part of heap buffer overflow exploitation prevention application 106, in accordance with one embodiment.

It another embodiment, an instruction, e.g., a jump instruction, is inserted directly into the heap deallocation function to hook the heap deallocation function in HOOK HEAP DEALLOCATION FUNCTION(S) OPERATION 604.

Although various examples of hooking a heap deallocation function are described above, in light of this disclosure, those of skill in the art will understand that other techniques can be used to hook heap deallocation function(s). The particular technique used depends, for example, on the particular operating system.

From HOOK HEAP DEALLOCATION FUNCTION(S) OPERATION 604, flow moves to a CALL TO HEAP DEALLOCATION FUNCTION OPERATION 606. In CALL TO HEAP DEALLOCATION FUNCTION OPERATION 606, a call, sometimes called a heap deallocation function call, to a heap deallocation function is made, for example, by a user mode application releasing a block of heap buffer. More particularly, a heap deallocation function call is made to a heap deallocation function that was hooked in HOOK HEAP DEALLOCATION FUNCTION(S) OPERATION 604.

In one embodiment, the application that releases the block of heap buffer and originates the heap deallocation function call is referred to as the heap block releasing application.

From CALL TO HEAP DEALLOCATION FUNCTION OPERATION 606, flow moves to a STALL CALL OPERATION 608. In STALL CALL OPERATION 608, the heap deallocation function call of OPERATION 606 to the heap deallocation function is stalled. By stalling the heap deallocation function call, deallocation of the released block of heap buffer is stalled.

As is well known to those of skill in art, the heap is broken into a set of variable sized blocks. A program, herein referred to as the heap block releasing application, releases a certain block size and the heap manager deallocates the block from a busy block to be a free block in a freelist to fulfill the release.

As discussed above, for performance reasons, the heap manager maintains doubly linked lists, i.e., freelists, of free blocks. When a busy block is deallocated, the heap manager changes the busy block to be a free block, and places the free block on the corresponding freelist. The busy block being deallocated is sometimes called the deallocated block. For example, the deallocated block is placed in the freelist formed of free blocks of the same size as the deallocated block. As discussed below, in accordance with one embodiment, the freelist on which the deallocated block is to be placed is checked for corruption, and if corrupted, corrected, prior to placement of the deallocated block on the freelist.

Further, with certain operating systems, to minimize heap fragmentation and thus for performance reasons, upon deallocation of a busy block, the heap manager attempts to coalesce other free blocks with the deallocated block into a larger free block. More particularly, the heap manager looks at the contiguous blocks of the heap buffer to determine if the contiguous blocks are free. As discussed above, each free block has information on the free block's contiguous blocks in the header portion of the free block. If the contiguous blocks are free, the contiguous free blocks are coalesced with the deallocated block into a larger free block.

The coalescence of the contiguous free blocks, hereinafter the coalesced free blocks, is a two-part operation. Initially, the coalesced free blocks are removed (allocated) from their respective freelist. As discussed above, removal of a free block from a freelist carries a risk of propagating corrupt F-links and B-links. Accordingly, as discussed below, in accordance with one embodiment, the freelist from which the coalesced free block is to be removed is checked for corruption, and if corrupted, corrected, prior to removal of the coalesced free block from the freelist.

Second, the larger free block created from the coalescence is placed in a freelist in the same manner as a deallocated block is placed in a freelist as discussed above.

Thus, from STALL CALL OPERATION 608, flow moves to a DETERMINE BLOCK DEALLOCATED OPERATION 610. In DETERMINE BLOCK DEALLOCATED OPERATION 610, the block of the heap buffer released by the program is determined. In one embodiment, parameters associated with the heap deallocation function call are analyzed to determine the deallocated block.

From DETERMINE BLOCK DEALLOCATED OPERATION 610, flow moves to a BLOCK COALESCING UPON DEALLOCATION CHECK OPERATION 612. In BLOCK COALESCING UPON DEALLOCATION CHECK OPERATION 612, a determination is made as to whether a free block is to be coalesced with the deallocated block. If a free block is to be coalesced with the deallocated block, flow moves from BLOCK COALESCING UPON DEALLOCATION CHECK OPERATION 612 to a READ HEADER INFORMATION IN HEAD, COALESCED, AND NEXT BLOCKS OPERATION 614. Conversely, if a free block is not to be coalesced with the deallocated block, flow moves from BLOCK COALESCING UPON DEALLOCATION CHECK OPERATION 612 to a READ HEADER INFORMATION IN HEAD AND FIRST BLOCKS OF THE DEALLOCATION FREELIST OPERATION 624.

In accordance with one embodiment, if the operating system does not support block coalescing or if this feature is disabled, a determination is made in BLOCK COALESCING UPON DEALLOCATION CHECK OPERATION 612 that there is no block coalescing upon deallocation and flow moves to READ HEADER INFORMATION IN HEAD

AND FIRST BLOCKS OF THE DEALLOCATION FREELIST OPERATION 624.

In accordance with another embodiment, if the operating system does support block coalescing but there are no available free blocks for coalescing, a determination is made in BLOCK COALESCING UPON DEALLOCATION CHECK OPERATION 612 that there is no block coalescing upon deallocation and flow moves to READ HEADER INFORMATION IN HEAD AND FIRST BLOCKS OF THE DEALLOCATION FREELIST OPERATION 624.

In accordance with yet another embodiment, if the operating system does support block coalescing and there is at least one available free block for coalescing, a determination is made in BLOCK COALESCING UPON DEALLOCATION CHECK OPERATION 612 that there is block coalescing upon deallocation and flow moves to READ HEADER INFORMATION IN HEAD, COALESCED, AND NEXT BLOCKS OPERATION 614.

In READ HEADER INFORMATION IN HEAD, COALESCED, AND NEXT BLOCKS OPERATION 614, the header information in the freelist containing the coalesced block is read. Specifically, the header information in the list head, the coalesced block, and the next block is read. In accordance with this embodiment, the list head is the list head of the freelist containing the coalesced block. The coalesced block is the block being removed from the freelist that is to be coalesced with the block being deallocated into a larger free block. The next block is the next forward free block of the coalesced block on the freelist containing the coalesced block.

In one embodiment, the F-link and the heap segment index of the list head are read. Further, the F-link, the B-link, and the heap segment index of the coalesced block are read. Finally, the B-link and the heap segment index of the next block are read.

From READ HEADER INFORMATION IN HEAD, COALESCED, AND NEXT BLOCKS OPERATION 614, flow moves to a F-LINKS AND B-LINKS IN ASSOCIATED HEAP SEGMENT CHECK OPERATION 616. In F-LINKS AND B-LINKS IN ASSOCIATED HEAP SEGMENT CHECK OPERATION 616, a determination is made as to whether the F-link of the list head, the F-link and B-link of the coalesced block, and the B-link of the next block point into the associated heap segment.

If a determination is made that the F-link of the list head, the F-link and B-link of the coalesced block, and the B-link of the next block point into the associated heap segment, flow moves from F-LINKS AND B-LINKS IN ASSOCIATED HEAP SEGMENT CHECK OPERATION 616 to an ADDITIONAL COALESCED BLOCKS CHECK OPERATION 618, which is discussed further below. Conversely, if a determination is made that at least one of the F-link of the list head, the F-link and B-link of the coalesced block, and the B-link of the next block does not point into the associated heap segment, flow moves from F-LINKS AND B-LINKS IN ASSOCIATED HEAP SEGMENT CHECK OPERATION 616 to a KNOWN FALSE POSITIVE CHECK OPERATION 620.

More particularly, absent corruption, the F-link of the list head, the F-link and B-link of the coalesced block and the B-link of the next block point into the associated heap segment. Accordingly, if the F-link of the list head, the F-link and B-link of the coalesced block, and the B-link of the next block point into the associated heap segment, the likelihood that malicious code, e.g., shell code, has been introduced into the head, coalesced and next blocks is minimal.

However, if a determination is made in CHECK OPERATION 616 that at least one of the F-link of the list head, the F-link and B-link of the coalesced block, and the B-link of the next block does not point into the associated heap segment, flow moves, optionally, to a KNOWN FALSE POSITIVE CHECK OPERATION 620 (or directly to a TAKE CORRECTIVE ACTION OPERATION 224 if KNOWN FALSE POSITIVE CHECK OPERATION 620 is not performed).

In KNOWN FALSE POSITIVE CHECK OPERATION 620, a determination is made as to whether the stray F-link(s) and/or stray B-link(s) are a known false positive. If a determination is made in KNOWN FALSE POSITIVE CHECK OPERATION 620 that the stray F-link(s) and/or stray B-link(s) is a known false positive stray F-link(s) and/or stray B-link(s), flow moves to ADDITIONAL COALESCED BLOCKS CHECK OPERATION 618. Conversely, if a determination is made in KNOWN FALSE POSITIVE CHECK OPERATION 620 that the stray F-link(s) and/or stray B-link(s) are not a known false positive stray F-link(s) and/or stray B-link(s), flow moves to TAKE CORRECTIVE ACTION OPERATION 224.

In TAKE CORRECTIVE ACTION OPERATION 224, corrective action is taken to prevent the malicious code of the freelist containing the coalesced block from causing damage to or exploiting host computer system 102. TAKE CORRECTIVE ACTION OPERATION 224 is discussed further below with reference to FIGS. 7-13. From TAKE CORRECTIVE ACTION OPERATION 224, flow moves to ADDITIONAL COALESCED BLOCKS CHECK OPERATION 618.

In ADDITIONAL COALESCED BLOCKS CHECK OPERATION 618, a determination is made as to whether there are additional blocks to be coalesced with the block being deallocated. If a determination is made that there are additional blocks to be coalesced with the block being deallocated, flow moves from ADDITIONAL COALESCED BLOCKS CHECK OPERATION 618 to a SELECT NEXT COALESCED BLOCK OPERATION 619. Conversely, if a determination is made that there are no additional blocks to be coalesced with the block being deallocated, flow moves from ADDITIONAL. COALESCED BLOCKS CHECK OPERATION 618 to READ HEADER INFORMATION IN HEAD AND FIRST BLOCKS OF THE DEALLOCATION FREELIST OPERATION 624.

For example, the block being deallocated is being coalesced with only a single free block, i.e., the coalesced block described above, and thus a determination is made that there are no additional blocks to be coalesced with the block being deallocated in ADDITIONAL COALESCED BLOCKS CHECK OPERATION 618. Conversely, the block being deallocated is being coalesced with two free block, e.g., the immediately contiguous previous and next free blocks, and thus a determination is made that there are additional blocks to be coalesced with the block being deallocated in ADDITIONAL COALESCED BLOCKS CHECK OPERATION 618.

If a determination is made that there are additional blocks to be coalesced with the block being deallocated in ADDITIONAL COALESCED BLOCKS CHECK OPERATION 618, flow moves to SELECT NEXT COALESCED BLOCK OPERATION 619.

In SELECT NEXT COALESCED BLOCK OPERATION 619, the next block to be coalesced with the block being deallocated is selected. From SELECT NEXT COALESCED BLOCK OPERATION 619, flow returns to READ HEADER INFORMATION IN HEAD, COALESCED, AND NEXT BLOCKS OPERATION 614, where the block selected in SELECT NEXT COALESCED BLOCK OPERATION 619 is now the coalesced block.

OPERATIONS 614, 616 and possibly OPERATIONS 620 and 224 are performed with the coalesced block selected in SELECT NEXT COALESCED BLOCK OPERATION 619. More generally, OPERATIONS 618, 619, 614, 616, and possibly OPERATIONS 620 and 224 are performed for each additional coalesced block until a determination is made that there are no additional coalesced blocks in ADDITIONAL COALESCED BLOCKS CHECK OPERATION 618.

Upon a determination that there are no additional coalesced blocks, flow moves from ADDITIONAL COALESCED BLOCKS CHECK OPERATION 618 to READ HEADER INFORMATION IN HEAD AND FIRST BLOCKS OF THE DEALLOCATION FREELIST OPERATION 624.

In READ HEADER INFORMATION IN HEAD AND FIRST BLOCKS OF THE DEALLOCATION FREELIST OPERATION 624, the header information in the list head and the first block of the freelist to which the block is being deallocated is read. The freelist to which the block is being deallocated (added) is sometimes called the deallocation freelist.

In accordance with this embodiment, the list head is the list head of the deallocation freelist. The first block is the first free block on the deallocation freelist immediately following the list head. The deallocated block is to be added between the list head and the first block on the deallocation freelist.

In one embodiment, the F-link and the heap segment index of the list head are read. Further, the B-link and the heap segment index of the first block are read.

From READ HEADER INFORMATION IN HEAD AND FIRST BLOCKS OF THE DEALLOCATION FREELIST OPERATION 624, flow moves to a F-LINKS AND B-LINKS IN ASSOCIATED HEAP SEGMENT CHECK OPERATION 626. In F-LINKS-AND-B-LINKS IN ASSOCIATED HEAP SEGMENT CHECK OPERATION 626, a determination is made as to whether the F-link of the list head and the B-link of the first block point into the associated heap segment.

If a determination is made that the F-link of the list head and the B-link of the first block point into the associated heap segment, flow moves from F-LINKS AND B-LINKS IN ASSOCIATED HEAP SEGMENT CHECK OPERATION 626 to a RELEASE CALL OPERATION 628. Conversely, if a determination is made that at least one of the F-link of the list head and the B-link of the first block does not point into the associated heap segment, flow moves from F-LINKS AND B-LINKS IN ASSOCIATED HEAP SEGMENT CHECK OPERATION 626 to an optional KNOWN FALSE POSITIVE CHECK OPERATION 630.

More particularly, absent corruption, the F-link of the list head and the B-link of the first block point into the associated heap segment. Accordingly, if the F-link of the list head and the B-link of the first block point into the associated heap segment, the likelihood that malicious code, e.g., shell code, has been introduced into the head and first blocks of the deallocation freelist is minimal. If there is no corruption, flow moves to RELEASE CALL OPERATION 628.

In RELEASE CALL OPERATION 628, the heap deallocation function call is allowed to proceed. As discussed above, the heap deallocation function call was stalled in STALL CALL OPERATION 608. From RELEASE CALL OPERATION 628, flow moves to and exits at an EXIT OPERATION 634 or waits for the next heap deallocation function call and returns to OPERATION 606.

However, if a determination is made in CHECK OPERATION 626 that at least one of the F-link of the list head and the B-link of the first block does not point into the associated heap segment, flow moves, optionally, to KNOWN FALSE POSITIVE CHECK OPERATION 630 (or directly to a TAKE CORRECTIVE ACTION OPERATION 224 if KNOWN FALSE POSITIVE CHECK OPERATION 630 is not performed).

In KNOWN FALSE POSITIVE CHECK OPERATION 630, a determination is made as to whether the stray F-link(s) and/or stray B-link(s) is a known false positive. If a determination is made in KNOWN FALSE POSITIVE CHECK OPERATION 630 that the stray F-link(s) and/or stray B-link(s) is a known false positive stray F-link(s) and/or stray B-link(s), flow moves to RELEASE CALL OPERATION 628, which is performed as discussed above. Conversely, if a determination is made in KNOWN FALSE POSITIVE CHECK OPERATION 630 that the stray F-link(s) and/or stray B-link(s) is not a known false positive stray F-link(s) and/or stray B-link(s), flow moves to TAKE CORRECTIVE ACTION OPERATION 224.

In TAKE CORRECTIVE ACTION OPERATION 224, corrective action is taken to prevent the malicious code of the deallocation freelist from causing damage to or exploiting host computer system 102. TAKE CORRECTIVE ACTION OPERATION 224 is discussed further below with reference to FIGS. 7-13. From TAKE CORRECTIVE ACTION OPERATION 224, flow moves to RELEASE CALL OPERATION 628, which is performed as discussed above.

Figure 7:
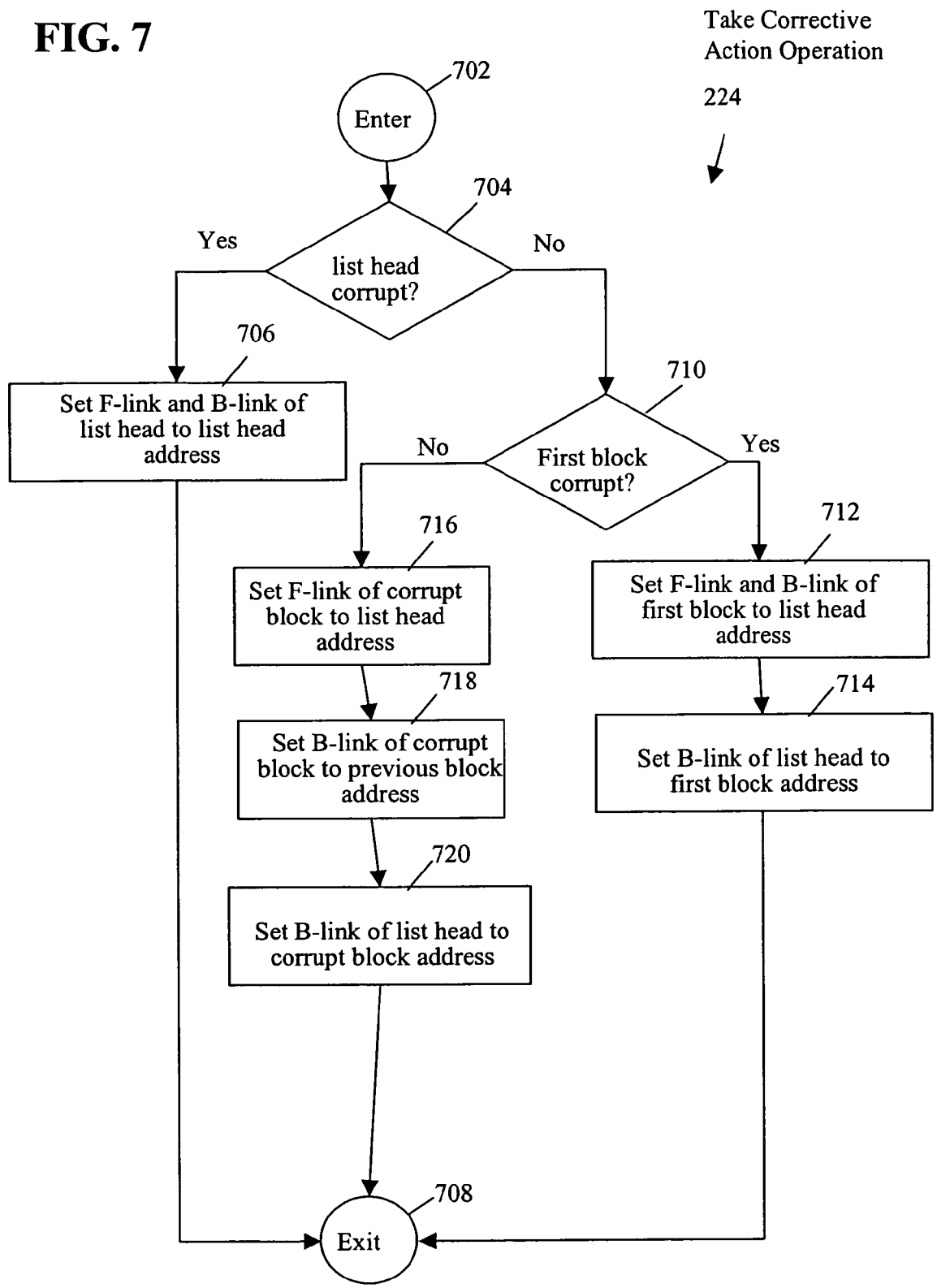
FIG. 7 is a flow diagram of a TAKE CORRECTIVE ACTION OPERATION in accordance with one embodiment of the present invention.

FIG. 7 is a flow diagram of TAKE CORRECTIVE ACTION OPERATION 224 in accordance with one embodiment of the present invention. Referring now to FIG. 7, from an ENTER OPERATION 702, flow moves to a LIST HEAD CORRUPT CHECK OPERATION 704. In LIST HEAD CORRUPT CHECK OPERATION 704, a determination is made as to whether the list head is corrupt.

If the list head is corrupt, flow moves from LIST HEAD CORRUPT CHECK OPERATION 704 to a SET F-LINK AND B-LINK OF LIST HEAD TO LIST HEAD ADDRESS OPERATION 706. In SET F-LINK AND B-LINK OF LIST HEAD TO LIST HEAD ADDRESS OPERATION 706, both the F-link and the B-link of the list head are set, sometimes called overwritten, with the address of the list head. From SET F-LINK AND B-LINK OF LIST HEAD TO LIST HEAD ADDRESS OPERATION 706, flow moves to and exits at an EXIT OPERATION 708.

Conversely, if a determination is made that the list head is not corrupt, flow moves from LIST HEAD CORRUPT CHECK OPERATION 704 to a FIRST BLOCK CORRUPT CHECK OPERATION 710.

In one embodiment, if the F-link of the list head points to an address outside of the associated heap segment, a determination is made that the list head is corrupt in LIST HEAD CORRUPT CHECK OPERATION 704. Conversely, if the F-link of the list head points to an address within the associated heap segment, a determination is made that the list head is not corrupt in LIST HEAD CORRUPT CHECK OPERATION 704.

In FIRST BLOCK CORRUPT CHECK OPERATION 710, a determination is made as to whether the first block is corrupt. The first block is the first free block immediately following the list head.

If a determination is made that the first block is corrupt, flow moves from FIRST BLOCK CORRUPT CHECK OPERATION 710 to a SET F-LINK AND B-LINK OF FIRST BLOCK TO LIST HEAD ADDRESS OPERATION 712. Conversely, if a determination is made that the first block is not corrupt, flow moves from FIRST BLOCK CORRUPT CHECK OPERATION 710 to a SET F-LINK OF CORRUPT BLOCK TO LIST HEAD ADDRESS OPERATION 716.

In one embodiment, if either the F-link or the B-link of the first block points to an address outside of the associated heap segment, a determination is made that the first block is corrupt in FIRST BLOCK CORRUPT CHECK OPERATION 710. Conversely, if both the F-link and the B-link of the first block point to addresses within the associated heap segment, a determination is made that the first block is not corrupt in FIRST BLOCK CORRUPT CHECK OPERATION 710.

In SET F-LINK AND B-LINK OF FIRST BLOCK TO LIST HEAD ADDRESS OPERATION 712, both the F-link and the B-link of the first block are set, sometimes called overwritten, with the address of the list head. From SET F-LINK AND B-LINK OF FIRST BLOCK TO LIST HEAD ADDRESS OPERATION 712, flow moves to a SET B-LINK OF LIST HEAD TO FIRST BLOCK ADDRESS OPERATION 714.

In SET B-LINK OF LIST HEAD TO FIRST BLOCK ADDRESS OPERATION 714, the B-link of the list head is set with the address of the first block. From SET B-LINK OF LIST HEAD TO FIRST BLOCK ADDRESS OPERATION 714, flow moves to and exits at EXIT OPERATION 708.

In SET F-LINK OF CORRUPT BLOCK TO LIST HEAD ADDRESS OPERATION 716, the F-link of the corrupt block is set with the address of the list head. From SET F-LINK OF CORRUPT BLOCK TO LIST HEAD ADDRESS OPERATION 716, flow moves to a SET B-LINK OF CORRUPT BLOCK TO PREVIOUS BLOCK ADDRESS OPERATION 718.

In SET B-LINK OF CORRUPT BLOCK TO PREVIOUS BLOCK ADDRESS OPERATION 718, the B-link of the corrupt block is set with the address of the previous block. The previous block is the free block just before the corrupt block. From SET B-LINK OF CORRUPT BLOCK TO PREVIOUS BLOCK ADDRESS OPERATION 718, flow moves to a SET B-LINK OF LIST HEAD TO CORRUPT BLOCK ADDRESS OPERATION 720.

In SET B-LINK OF LIST HEAD TO CORRUPT BLOCK ADDRESS OPERATION 720, the B-link of the list head is set with the address of the corrupt block. The corrupt block is the block that has an F-link and/or B-link pointing to an address outside of the associated heap segment. From SET B-LINK OF LIST HEAD TO CORRUPT BLOCK ADDRESS OPERATION 720, flow moves to and exits at EXIT OPERATION 708.

Figure 8:
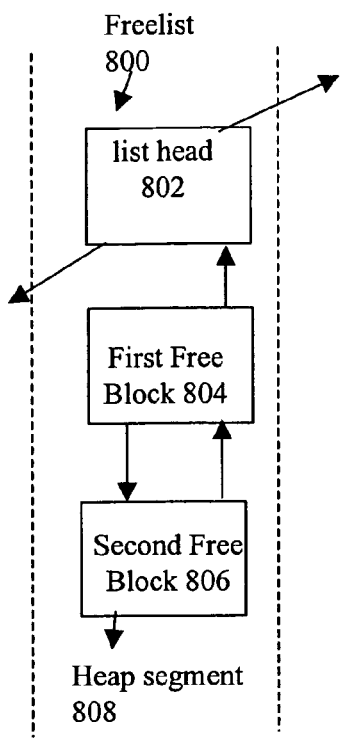
FIG. 8 is a block diagram of a freelist within a heap segment in accordance with one embodiment of the present invention.
Figure 9:
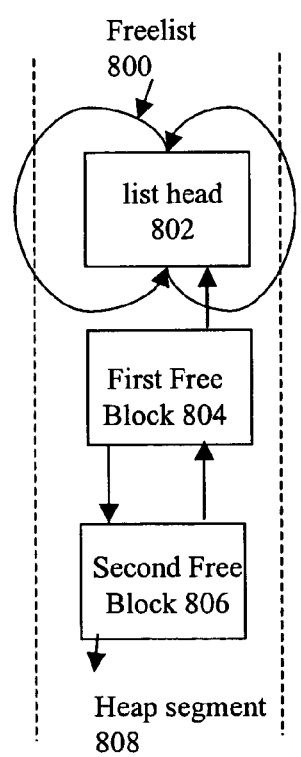
FIG. 9 is a block diagram of the freelist of FIG. 8 after performance of the TAKE CORRECTIVE ACTION OPERATION of FIG. 7.

FIG. 8 is a block diagram of a freelist 800 within a heap segment 808 in accordance with one embodiment of the present invention. FIG. 9 is a block diagram of freelist 800 of FIG. 8 after performance of TAKE CORRECTIVE ACTION OPERATION 224 of FIG. 7.

Referring now to FIG. 8, freelist 800 includes a list head 802, a first free block 804, and a second free block 806. Heap segment 808 is indicated by the two vertical dashed lines.

In accordance with this embodiment, list head 802 is corrupt such that both the F-link and the B-link of list head 802 point outside of heap segment 808 as indicated by the arrows extending from list head 802.

Referring now to FIGS. 7 and 8 together, from ENTER OPERATION 702, flow moves to LIST HEAD CORRUPT CHECK OPERATION 704. In LIST HEAD CORRUPT CHECK OPERATION 704, a determination is made that list head 802 is corrupt and flow moves to SET F-LINK AND B-LINK OF LIST HEAD TO LIST HEAD ADDRESS OPERATION 706. In SET F-LINK AND B-LINK OF LIST HEAD TO LIST HEAD ADDRESS OPERATION 706, both the F-link and the B-link of list head 802 are set with the address of list head 802 as shown in FIG. 9.

Thus, as shown in FIG. 9, freelist 800 is reduced to include only list head 802. More particularly, first free block 804 and second free block 806 are removed from, sometimes called cutoff, freelist 800.

Figure 10:
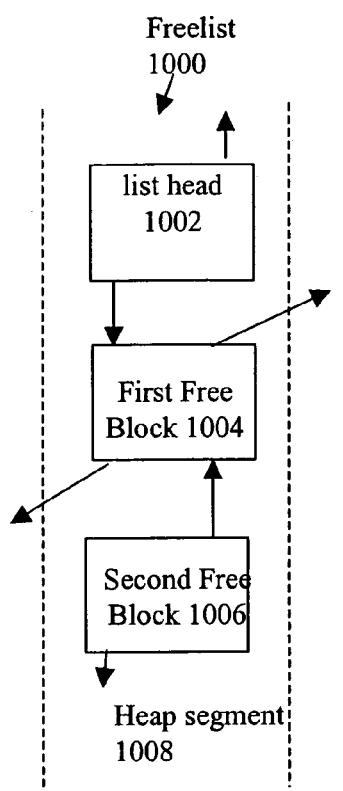
FIG. 10 is a block diagram of a freelist within a heap segment in accordance with another embodiment of the present invention.
Figure 11:
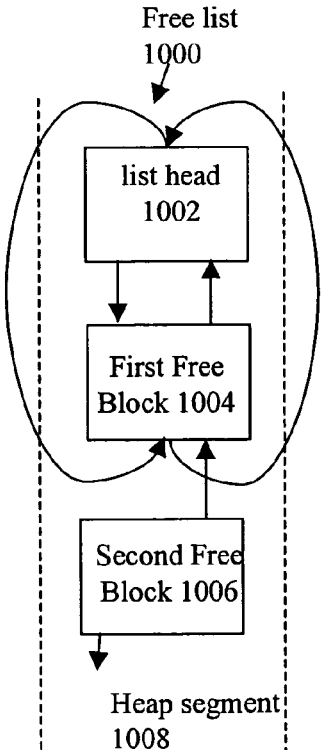
FIG. 11 is a block diagram of the freelist of FIG. 10 after performance of the TAKE CORRECTIVE ACTION OPERATION of FIG. 7.

FIG. 10 is a block diagram of a freelist 1000 within a heap segment 1008 in accordance with another embodiment of the present invention. FIG. 11 is a block diagram of freelist 1000 of FIG. 10 after performance of TAKE CORRECTIVE ACTION OPERATION 224 of FIG. 7.

Referring now to FIG. 10, freelist 1000 includes a list head 1002, a first free block 1004, and a second free block 1006. Heap segment 1008 is indicated by the two vertical dashed lines.

In accordance with this embodiment, first free block 1004 is corrupt such that both the F-link and the B-link of first free block 1004 point outside of heap segment 1008 as indicated by the arrows extending from first free block 1004.

Referring now to FIGS. 7 and 10 together, from ENTER OPERATION 702, flow moves to LIST HEAD CORRUPT CHECK OPERATION 704. In LIST HEAD CORRUPT CHECK OPERATION 704, a determination is made that list head 1002 is not corrupt and flow moves to FIRST BLOCK CORRUPT CHECK OPERATION 710.

In FIRST BLOCK CORRUPT CHECK OPERATION 710, a determination is made that first free block 1004 is corrupt. Thus, flow moves from FIRST BLOCK CORRUPT CHECK OPERATION 710 to SET F-LINK AND B-LINK OF FIRST BLOCK TO LIST HEAD ADDRESS OPERATION 712.

In SET F-LINK AND B-LINK OF FIRST BLOCK TO LIST HEAD ADDRESS OPERATION 712, both the F-link and the B-link of first free block 1004 are set with the address of list head 1002 as shown in FIG. 11.

From SET F-LINK AND B-LINK OF FIRST BLOCK TO LIST HEAD ADDRESS OPERATION 712, flow moves to SET B-LINK OF LIST HEAD TO FIRST BLOCK ADDRESS OPERATION 714. In SET B-LINK OF LIST HEAD TO FIRST BLOCK ADDRESS OPERATION 714, the B-link of list head 1002 is set to the address of first free block 1004 as shown in FIG. 11

Thus, as shown in FIG. 11, freelist 1000 is reduced to include only list head 1002 and first free block 1004. More particularly, second free block 1006 is removed from freelist 1000.

Figure 12:
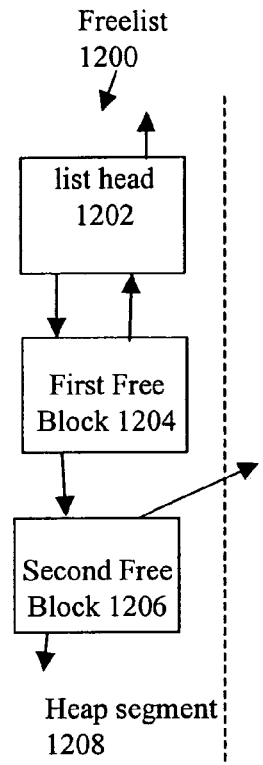
FIG. 12 is a block diagram of a freelist within a heap segment in accordance with yet another embodiment of the present invention.
Figure 13:
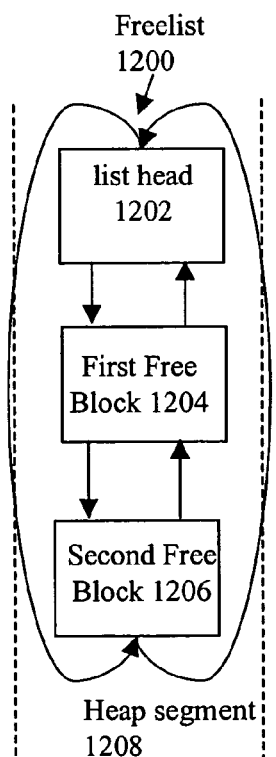
FIG. 13 is a block diagram of the freelist of FIG. 12 after performance of the TAKE CORRECTIVE ACTION OPERATION of FIG. 7.

FIG. 12 is a block diagram of a freelist 1200 within a heap segment 1208 in accordance with yet another embodiment of the present invention. FIG. 13 is a block diagram of freelist 1200 of FIG. 12 after performance of TAKE CORRECTIVE ACTION OPERATION 224 of FIG. 7.

Referring now to FIG. 12, freelist 1200 includes a list head 1202, a first free block 1204, and a second free block 1206. Heap segment 1208 is indicated by the two vertical dashed lines.

In accordance with this embodiment, second free block 1206 is corrupt such that the B-link of second free block 1206 points outside of heap segment 1208 as indicated by the arrow extending from second free block 1206.

Referring now to FIGS. 7 and 12 together, from ENTER OPERATION 702, flow moves to LIST HEAD CORRUPT CHECK OPERATION 704. In LIST HEAD CORRUPT CHECK OPERATION 704, a determination is made that list head 1202 is not corrupt and flow moves to FIRST BLOCK CORRUPT CHECK OPERATION 710.

In FIRST BLOCK CORRUPT CHECK OPERATION 710, a determination is made that first free block 1204 is not corrupt. Thus, flow moves from FIRST BLOCK CORRUPT CHECK OPERATION 710 to SET F-LINK OF CORRUPT BLOCK TO LIST HEAD ADDRESS OPERATION 716.

In SET F-LINK OF CORRUPT BLOCK TO LIST HEAD ADDRESS OPERATION 716, the F-link of second free block 1206 is set with the address of list head 1202 as shown in FIG. 13.

From SET F-LINK OF CORRUPT BLOCK TO LIST HEAD ADDRESS OPERATION 716, flow moves to SET B-LINK OF CORRUPT BLOCK TO PREVIOUS BLOCK ADDRESS OPERATION 718. In SET B-LINK OF CORRUPT BLOCK TO PREVIOUS BLOCK ADDRESS OPERATION 718, the B-link of second free block 1206 is set to the address of first free block 1204 as shown in FIG. 13.

From SET B-LINK OF CORRUPT BLOCK TO PREVIOUS BLOCK ADDRESS OPERATION 718, flow moves to SET B-LINK OF LIST HEAD TO CORRUPT BLOCK ADDRESS OPERATION 720. In SET B-LINK OF LIST HEAD TO CORRUPT BLOCK ADDRESS OPERATION 720, the B-link of list head 1202 is set to the address of second free block 1206 as shown in FIG. 13.

Thus, as shown in FIG. 13, freelist 1200 is corrected and continues to include list head 1202, first free block 1204 and second free block 1206.

Referring again to FIG. 1, heap buffer overflow exploitation prevention application 106 is in computer memory 114. As used herein, a computer memory refers to a volatile memory, a non-volatile memory, or a combination of the two.

Although heap buffer overflow exploitation prevention application 106 is referred to as an application, this is illustrative only. Heap buffer overflow exploitation prevention application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, heap buffer overflow exploitation prevention application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the heap buffer overflow exploitation prevention functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the heap buffer overflow exploitation prevention functionality in accordance with one embodiment of the present invention can be implemented in a wide variety of computer system configurations. In addition, the heap buffer overflow exploitation prevention functionality could be stored as different modules in memories of different devices. For example, heap buffer overflow exploitation prevention application 106 could initially be stored in server system 130, and then as necessary, a portion of heap buffer overflow exploitation prevention application 106 could be transferred to host computer system 102 and executed on host computer system 102. Consequently, part of the heap buffer overflow exploitation prevention functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, heap buffer overflow exploitation prevention application 106 is stored in memory 136 of server system 130. Heap buffer overflow exploitation prevention application 106 is transferred over network 124 to memory 114 in host computer system 102. In this embodiment, network interface 138 and I/O interface 110 would include analog modems, digital modems, or a network interface card. If modems are used, network 124 includes a communications network, and heap buffer overflow exploitation prevention application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
    stalling a heap allocation function call to a heap allocation function originating from a request by an application for a block of heap buffer;
    predicting a predicted block of said heap buffer to fulfill said request, said predicted block comprising a header portion and a data portion reserved for data; and
    determining if a forward link (F-link) in a F-link field and a backward link (B-link) in a B-link field of said header portion of said predicted block are addresses within a heap segment associated with said predicted block, wherein upon a determination that said F-link and said B-link of said predicted block are not addresses within said heap segment, said method further comprising taking corrective action comprising setting said F-link and said B-link to be an address of a list head of a freelist comprising said predicted block.

2. The method of claim 1 further comprising hooking said heap allocation function.

3. The method of claim 1 further comprising determining a size of said block.

4. The method of claim 3 wherein said predicted block has said size.

5. The method of claim 3 wherein said freelist comprises a plurality of free blocks having said size, said predicted block being on said freelist.

6. The method of claim 1 further comprising determining whether a F-link of said list head of said freelist points into said heap segment.

7. The method of claim 1 further comprising determining whether a B-link of a predicted next block of said freelist points into said heap segment.

8. A method comprising:
   stalling a heap deallocation function call to a heap deallocation function originating from a release by an application of a block of heap buffer, wherein said block is a deallocation block that is being deallocated to a deallocation freelist; and
   determining if a forward link (F-link) in a F-link field of a header portion of a list head of said deallocation freelist and a backward link (B-link) in a B-link field of a header portion of a first block of said deallocation freelist are addresses within a heap segment associated with said deallocation freelist, said first block further comprising a data portion reserved for data, wherein upon a determination that said F-link is not an address within said heap segment, said method further comprising taking corrective action comprising setting said F-link and a B-link in a B-link field of a header portion of said list head to be an address of said list head.

9. The method of claim 8 further comprising reading said F-link and said B-link in said B-link field of said header portion of said first block.

10. The method of claim 8 further comprising hooking said heap deallocation function.

11. The method of claim 8 further comprising determining said block being released by said application.

12. The method of claim 8 wherein upon a determination that said F-link and said B-link in said B-link field of said header portion of said first block are addresses within said heap segment, said method further comprising releasing said heap deallocation function call.

13. The method of claim 8 wherein said F-link or said B-link in said B-link field of said header portion of said first block is a stray F-link or stray B-link, said method further comprising determining if said stray F-link or stray B-link is a known false positive.

14. The method of claim 8 further comprising determining if said block is to be coalesced with other free blocks.

15. The method of claim 8 wherein said block is to be coalesced with a coalesced block, said method further comprising:
   determining if a F-link and a B-link of said coalesced block are addresses within a heap segment associated with said coalesced block.

16. The method of claim 15 further comprising determining if there are other blocks to be coalesced with said block.

17. A computer-program product comprising a tangible computer-readable storage medium containing computer program code comprising:
   a heap buffer overflow exploitation prevention application for stalling a heap allocation function call to a heap allocation function originating from a request by an application for a block of heap buffer;
   said heap buffer overflow exploitation prevention application further for predicting a predicted block of said heap buffer to fulfill said request, said predicted block comprising a header portion and a data portion reserved for data; and
   said heap buffer overflow exploitation prevention application further for determining if a forward link (F-link) in a F-link field and a backward link (B-link) in a B-link field of said header portion of said predicted block are addresses within a heap segment associated with said predicted block, wherein upon a determination that said F-link and said B-link of said predicted block are not addresses within said heap segment, said heap buffer overflow exploitation prevention application further for taking corrective action comprising setting said F-link and said B-link to be an address of a list head of a freelist comprising said predicted block.

* * * * *